(12) United States Patent
Veros et al.

(10) Patent No.: US 9,163,972 B2
(45) Date of Patent: Oct. 20, 2015

(54) APPARATUS AND METHOD FOR REDUCING CROSS-TALK BETWEEN CAPACITIVE SENSORS

(71) Applicant: Masco Corporation of Indiana, Indianapolis, IN (US)

(72) Inventors: Michael J. Veros, Carmel, IN (US); Joel D. Sawaski, Indianapolis, IN (US); Randy L. Schneider, II, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 321 days.

(21) Appl. No.: 13/798,406

(22) Filed: Mar. 13, 2013

(65) Prior Publication Data

US 2013/0186196 A1    Jul. 25, 2013

Related U.S. Application Data

(63) Continuation-in-part of application No. 13/495,525, filed on Jun. 13, 2012, now Pat. No. 8,973,612.

(60) Provisional application No. 61/497,793, filed on Jun. 16, 2011.

(51) Int. Cl.
*G01F 23/26* (2006.01)
*E03D 5/10* (2006.01)
*A47K 5/12* (2006.01)
*E03C 1/05* (2006.01)

(52) U.S. Cl.
CPC ............ *G01F 23/263* (2013.01); *A47K 5/1217* (2013.01); *E03D 5/105* (2013.01); *E03C 1/057* (2013.01)

(58) Field of Classification Search
CPC ........ F16K 19/006; F16K 31/02; E03D 1/057; E03D 5/105; G05D 9/12; G01F 23/263; G01F 23/265; G01F 23/266; G01F 23/268; G01R 27/2605; A47K 5/1217
See application file for complete search history.

(56) References Cited

U.S. PATENT DOCUMENTS

| | | | |
|---|---|---|---|
| 3,585,653 | A | 6/1971 | Forbes et al. |
| 4,041,557 | A | 8/1977 | Ringler |
| 4,141,091 | A | 2/1979 | Pulvari |
| 4,258,444 | A | 3/1981 | Orszullok |
| 4,756,031 | A | 7/1988 | Barrett |
| 4,780,705 | A | 10/1988 | Beane |
| 4,876,751 | A | 10/1989 | Van Meter |
| 4,941,215 | A | 7/1990 | Liu |
| 5,175,505 | A | 12/1992 | Magenau et al. |

(Continued)

FOREIGN PATENT DOCUMENTS

| | | |
|---|---|---|
| WO | WO 2007/082301 | 1/2006 |
| WO | WO 2009/005817 | 1/2009 |

OTHER PUBLICATIONS

PCT International Search Report and Written Opinion for PCT/US2014/018976, 12 pages, dated Aug. 5, 2014.

(Continued)

*Primary Examiner* — Matthew W Jellett
(74) *Attorney, Agent, or Firm* — Faegre Baker Daniels LLP

(57) ABSTRACT

An apparatus and method is provided to reduce cross-talk between multiple capacitive sensors used in an electronic toilet and between multiple capacitive sensors used in an electronic faucet and an electronic soap dispenser.

10 Claims, 4 Drawing Sheets

(56) References Cited

U.S. PATENT DOCUMENTS

| | | | |
|---|---|---|---|
| 5,730,165 | A | 3/1998 | Philipp |
| 5,940,899 | A | 8/1999 | Mankin et al. |
| 6,052,841 | A | 4/2000 | Mankin et al. |
| 6,058,519 | A | 5/2000 | Quintana |
| 6,202,227 | B1 | 3/2001 | Gurowitz |
| 6,279,179 | B1 | 8/2001 | Register |
| 6,671,894 | B1 | 1/2004 | Sigrist |
| 6,877,170 | B1 | 4/2005 | Quintana et al. |
| 6,934,977 | B1 | 8/2005 | Quintana et al. |
| 6,943,566 | B2 * | 9/2005 | Florin et al. .......... 324/662 |
| 6,962,168 | B2 | 11/2005 | McDaniel et al. |
| 7,015,704 | B1 | 3/2006 | Lang |
| 7,150,293 | B2 | 12/2006 | Lang |
| 7,156,363 | B2 | 1/2007 | Parsons et al. |
| 7,232,111 | B2 | 6/2007 | McDaniel et al. |
| 7,322,054 | B2 | 1/2008 | Bush |
| 7,325,781 | B2 | 2/2008 | Parsons et al. |
| 7,437,778 | B2 | 10/2008 | Parsons et al. |
| 7,458,520 | B2 | 12/2008 | Belz et al. |
| 7,500,277 | B2 | 3/2009 | Bush |
| 7,690,395 | B2 | 4/2010 | Jonte et al. |
| 7,814,582 | B2 | 10/2010 | Reddy et al. |
| 7,950,265 | B2 | 5/2011 | Bowcutt et al. |
| 7,997,301 | B2 | 8/2011 | Marty et al. |
| 8,166,996 | B2 | 5/2012 | Canfield et al. |
| 8,237,456 | B2 | 8/2012 | Dubery |
| 2003/0019367 | A1 | 1/2003 | Fogagnolo et al. |
| 2003/0067309 | A1 | 4/2003 | Nakayama et al. |
| 2007/0157374 | A1 | 7/2007 | Morris |
| 2007/0200078 | A1 | 8/2007 | Parsons et al. |
| 2008/0109956 | A1 | 5/2008 | Bayley et al. |
| 2009/0229683 | A1 | 9/2009 | Baek et al. |
| 2009/0293192 | A1 | 12/2009 | Pons |
| 2010/0012194 | A1 | 1/2010 | Jonte et al. |
| 2010/0024112 | A1 | 2/2010 | Parsons et al. |
| 2010/0024895 | A1 | 2/2010 | Parsons et al. |
| 2010/0108165 | A1 | 5/2010 | Rodenbeck et al. |
| 2010/0170570 | A1 | 7/2010 | Rodenbeck et al. |
| 2010/0252759 | A1 | 10/2010 | Guler et al. |
| 2011/0155934 | A1 | 6/2011 | Guler et al. |
| 2012/0211094 | A1 | 8/2012 | Quintana et al. |
| 2012/0318364 | A1 | 12/2012 | Sawaski et al. |

OTHER PUBLICATIONS

Technical Concepts, AutoFlush® for Tank Toilet Wireless Model, Installation and Maintenance instructions, 2003, 8 pgs.

NUCA Compas 2011-2012 Plumbing Technologies Brochure, Front cover. pp. 22-25, and back cover.

* cited by examiner

APPARATUS AND METHOD FOR REDUCING CROSS-TALK BETWEEN CAPACITIVE SENSORS

CROSS-REFERENCE TO RELATED APPLICATION

This application is a continuation-in-part of U.S. application Ser. No. 13/495,525, filed on Jun. 13, 2012, which is a claims priority to U.S. Provisional Application Ser. No. 61,497,793, filed Jun. 16, 2011, the disclosures of which are expressly incorporated by reference herein.

BACKGROUND AND SUMMARY

The present disclosure relates generally to an apparatus and method for reducing cross-talk between capacitive sensors. More particularly, the present disclosure relates to reducing cross-talk between capacitive sensors used in plumbing applications such as electronic faucets, electronic toilets and related electronic accessories such as electronic soap dispensers, for example.

Electronic faucets are often used to control fluid flow. Electronic faucets may include proximity sensors such as active infrared ("IR") proximity detectors or capacitive proximity sensors. Such proximity sensors are used to detect a user's hands positioned near the faucet, and turn the water on and off in response to detection of the user's hands. Other electronic faucets may use touch sensors to control the faucet. Such touch sensors include capacitive touch sensors or other types of touch sensors located on a spout of the faucet or on a handle for controlling the faucet. Capacitive sensors on the faucet may also be used to detect both touching of faucet components and proximity of the user's hands adjacent the faucet.

Capacitive sensors are also used as flush actuation sensors, tank fill sensors and bowl overflow sensors in electronic toilet applications. In addition, capacitive sensors are used on plumbing related accessories such as liquid soap dispensers, for example.

In capacitive sensing applications, other components located near the electronic faucet may have unintended effects on the output signal from the capacitive sensors. For instance, a user touching a metal sink basin may induce a false capacitive signal at the capacitive sensors. Changes that occur below a sink deck may also cause false readings at the capacitive sensors.

In other capacitive sensing applications, multiple capacitive sensors coupled to the same controller may produce cross-talk between the capacitive sensors and therefore also have unintended effects on the output signals from the capacitive sensors. For example, large changes in capacitance of a first capacitive sensor may cause changes in capacitance of a second capacitive sensor large enough to trigger a false sensing event in the second capacitive sensor. Conventional sensing applications use complicated software algorithms to try to reduce the effects of cross-talk between adjacent capacitive sensors.

In one illustrated embodiment of the present disclosure, a sensing apparatus includes a first capacitive sensor coupled to a first component, and a second capacitive sensor coupled to a second component. The second capacitive sensor includes a sensing electrode, a first sense wire coupled to the electrode, and a second sense wire spaced apart from the electrode. The sensing apparatus also includes a controller coupled to the first capacitive sensor and to the first and second sense wires of the second capacitive sensor. The controller is programmed to determine a difference signal between first and second output signals received from the first and second sense wires of the second capacitive sensor, respectively, to reduce an effect of cross-talk from the first capacitive sensor on the second capacitive sensor. The controller is also programmed to analyze the difference signal to detect a change in capacitance of the second capacitive sensor caused by an event.

In another illustrated embodiment of the present disclosure, an electronic toilet includes a toilet tank configured to receive and hold water from a water supply therein, at least one capacitive sensor located within the toilet tank, a toilet bowl in fluid communication with the toilet tank, and a bowl overflow capacitive sensor coupled to the toilet bowl a location above a normal water fill level of the toilet bowl. The bowl overflow capacitive sensor includes a sensing electrode, a first sense wire coupled to the electrode, and a second sense wire spaced apart from the electrode. The electronic toilet also includes a controller coupled to the at least one capacitive sensor in the toilet tank and to the first and second sense wires of the bowl overflow capacitive sensor. The controller is programmed to determine a difference signal between output signals received from the first and second sense wires of the bowl overflow capacitive sensor to reduce the effect of cross-talk on the bowl overflow capacitive sensor. The controller is also programmed to analyze the difference signal to determine when a water level in the toilet bowl is above the normal water fill level of the toilet bowl.

In yet another illustrated embodiment of the present disclosure, an electronic soap dispenser includes a dispensing head including an outlet, a pump operably coupled to a soap storage reservoir to pump the liquid soap from the soap storage reservoir to the outlet of the dispensing head, and a capacitive sensor operably coupled to the dispensing head. The capacitive sensor includes an electrode, a first sense wire coupled to the electrode, and a second sense wire spaced apart from the electrode. The electronic soap dispenser also includes a controller coupled to the first and second sense wires of the capacitive sensor. The controller is programmed to receive first and second output signals the first and second sense wires, respectively, to determine a difference signal from a difference between the first and second output signals, and to analyze the difference signal to detect actuation of the capacitive sensor by a user, and to selectively actuate the pump to dispense soap from the outlet of the dispensing head in response to a detected actuation of the capacitive sensor by the user.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
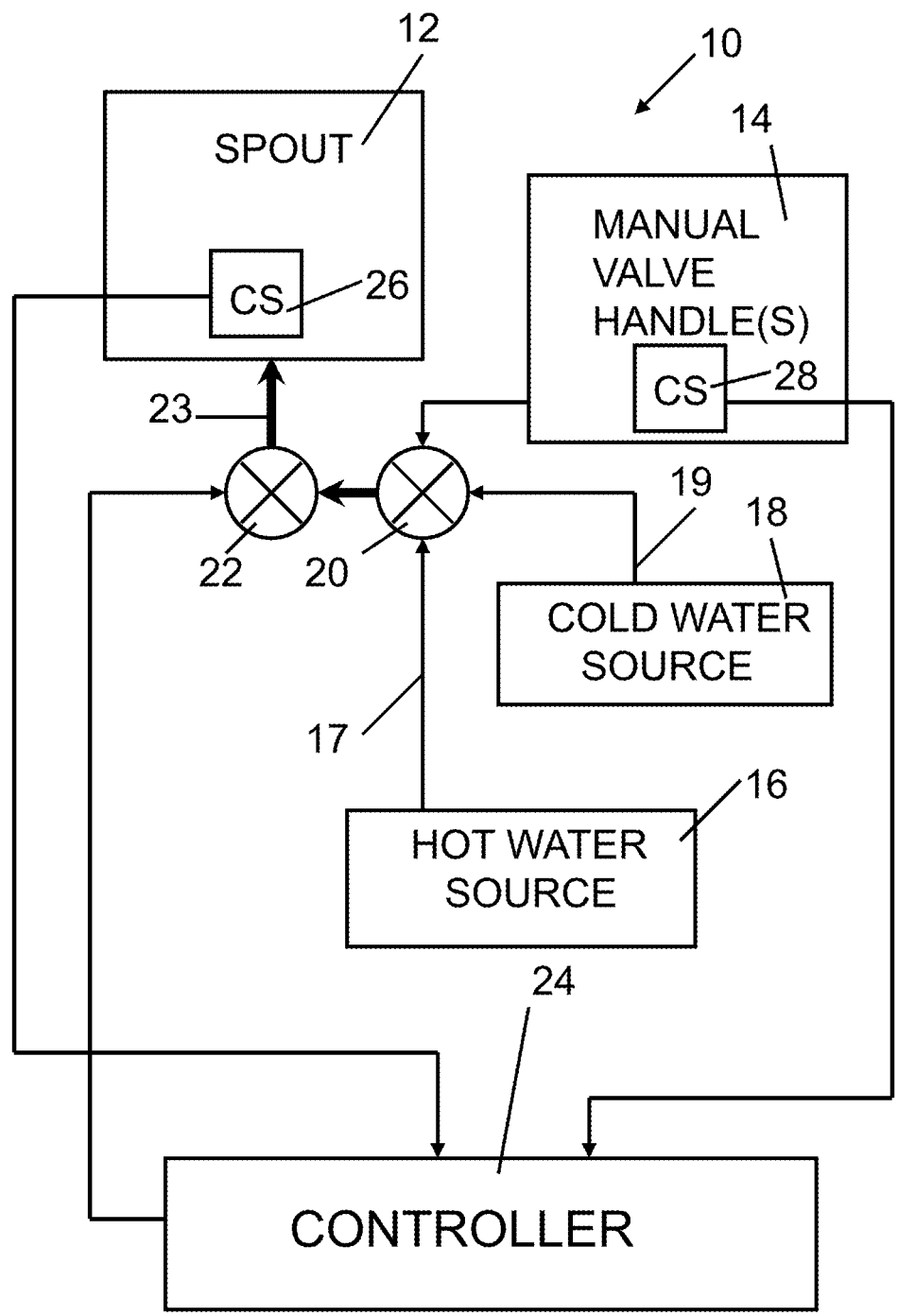
FIG. 1 is a block diagram of an illustrated embodiment electronic faucet.

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

FIG. 1 is a block diagram showing one illustrative embodiment of an electronic faucet 10 of the present disclosure. The faucet 10 illustratively includes a spout 12 for delivering fluids such as water and at least one manual valve handle 14 for controlling the flow of fluid through the spout 12 in a manual mode. A hot water source 16 and cold water source 18 are coupled to a manual valve body assembly 20 by fluid supply lines 17 and 19, respectively. The valve handle 14 is operably coupled to the manual valve body assembly 20 to control water flow therethrough.

In one illustrated embodiment, separate manual valve handles 14 are provided for the hot and cold water sources 16, 18. In other embodiments, such as a kitchen faucet embodiment, a single manual valve handle 14 is used for both hot and cold water delivery. In such kitchen faucet embodiment, the manual valve handle 14 and spout 12 are typically coupled to a basin through a single hole mount. An output of valve body assembly 20 is coupled to an actuator driven valve 22 which is controlled electronically by input signals received from a controller 24. In an illustrative embodiment, actuator driven valve 22 is an electrically operable valve, such as a solenoid valve. An output of actuator driven valve 22 supplies fluid to the spout 12 through supply line 23.

In an alternative embodiment, the hot water source 16 and cold water source 18 are connected directly to actuator driven valve 22 to provide a fully automatic faucet without any manual controls. In yet another embodiment, the controller 24 controls an electronic proportioning valve (not shown) to supply fluid to the spout 12 from hot and cold water sources 16, 18.

Because the actuator driven valve 22 is controlled electronically by controller 24, flow of water can be controlled using outputs from sensors such as capacitive sensors 26, 28. As shown in FIG. 1, when the actuator driven valve 22 is open, the faucet 10 may be operated in a conventional manner, i.e., in a manual control mode through operation of the handle(s) 14 and the manual valve member of valve body assembly 20. Conversely, when the manually controlled valve body assembly 20 is set to select a water temperature and flow rate, the actuator driven valve 22 can be touch controlled, or activated by proximity sensors when an object (such as a user's hands) are within a detection zone to toggle water flow on and off In one illustrated embodiment, spout 12 has a capacitive sensor 26 connected to controller 24. In addition, the manual valve handle(s) 14 also have capacitive sensor(s) 28 mounted thereon which are electrically coupled to controller 24. The output signals from capacitive sensors 26, 28 are used to control actuator driven valve 22 which thereby controls flow of water to the spout 12 from the hot and cold water sources 16 and 18. By sensing capacitance changes with capacitive sensors 26, 28, the controller 24 can make logical decisions to control different modes of operation of faucet 10 such as changing between a manual mode of operation and a hands free mode of operation as further described in U.S. Application Publication No. 2010/0170570; and U.S. Pat. Nos. 7,690, 395 and 7,150,293; and 7,997,301, the disclosures of which are all expressly incorporated herein by reference. Another illustrated configuration for a proximity detector and logical control for the faucet in response to the proximity detector is described in greater detail in U.S. Pat. No. 7,232,111, which is hereby incorporated by reference in its entirety.

The amount of fluid from hot water source 16 and cold water source 18 is determined based on one or more user inputs, such as desired fluid temperature, desired fluid flow rate, desired fluid volume, various task based inputs, various recognized presentments, and/or combinations thereof. As discussed above, the faucet 10 may also include an electronically controlled proportioning or mixing valve which is in fluid communication with both hot water source 16 and cold water source 18. Exemplary electronically controlled mixing valves are described in U.S. Pat. No. 7,458,520 and PCT International Publication No. WO 2007/082301, the disclosures of which are expressly incorporated by reference herein.

Figure 2:
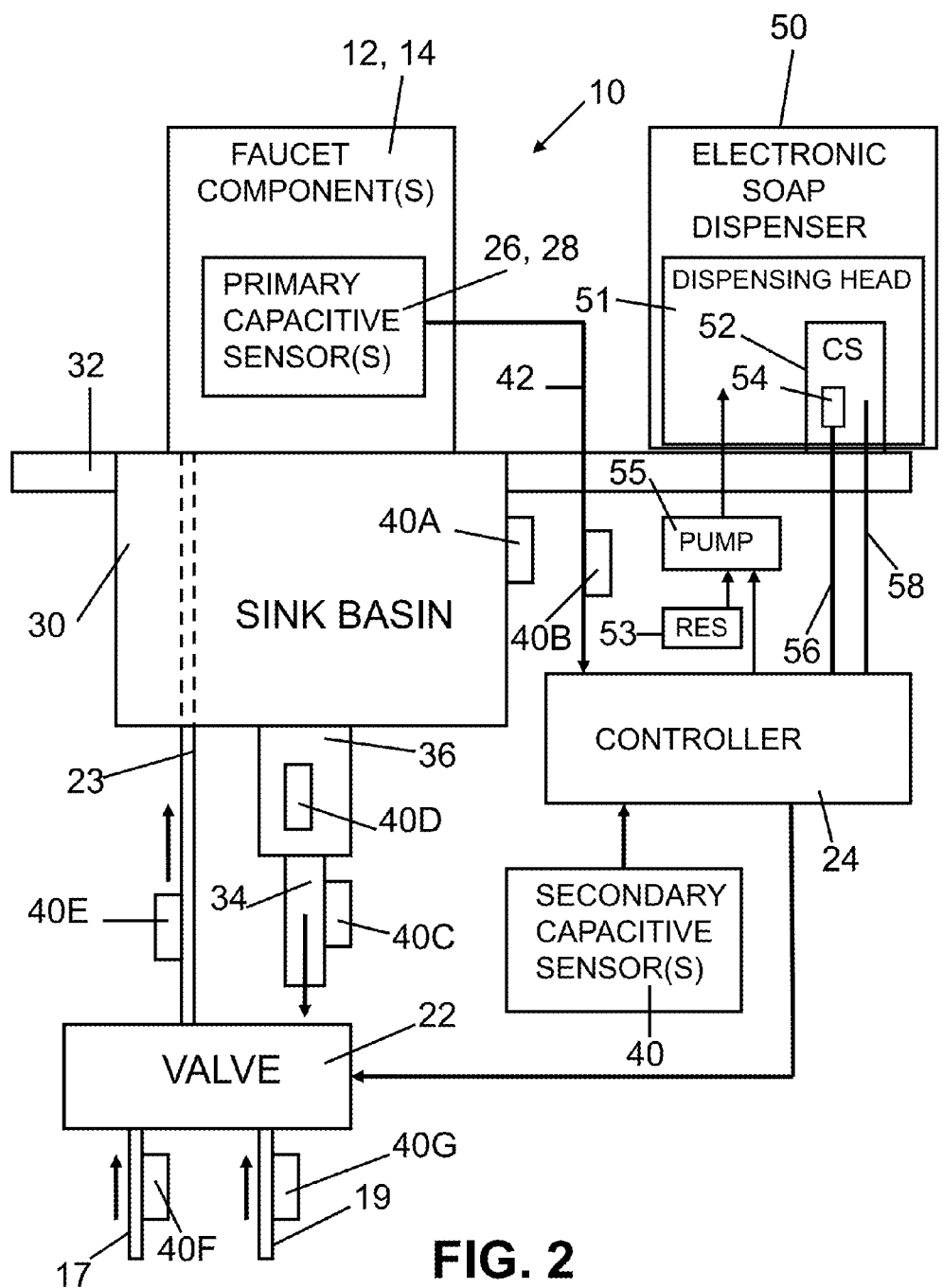
FIG. 2 is a block diagram illustrating further details of the electronic faucet of an illustrated embodiment of the present disclosure including at least one primary capacitive sensor coupled to a component of the faucet, such as a spout or a handle, and a plurality of secondary capacitive sensors to measure unintended capacitive signals near the faucet.

Additional details of an exemplary embodiment of the electronic faucet are illustrated in FIG. 2. FIG. 2 illustrates a faucet 10 including at least one primary capacitive sensor 26, 28 located on a component of the faucet such as a spout 12 or a handle 14 as discussed above. The primary capacitive sensor 26, 28 detects touching of a faucet component or proximity of a user in a detection region located near the faucet component. The primary capacitive sensor(s) 26, 28 is (are) illustratively coupled to a processor or controller 24 used to actuate valve 22 in response to detecting the touching of the faucet 10 or detecting the user (e.g. hands, arms, etc.) in close proximity to the faucet 10 for hands-free activation of the faucet 10 as discussed above.

In capacitive sensing in faucet applications, other components located near the faucet 10 may have unintended effects on the output signal from the primary capacitive sensor(s) 26, 28. For instance, a user touching a metal sink basin 30 may induce a false capacitive signal at the primary capacitive sensor(s) 26, 28. Changes that occur below a sink deck 32 may also cause false readings at the primary capacitive sensor(s) 26, 28. These below deck changes may include, for example, water going down a drain 34 or someone moving an object below the deck 32. A garbage disposal 36 or other static electricity source may also have an effect on readings of the primary capacitive sensor(s) 26, 28. In addition, a 60 Hz hum of AC power systems located below the deck 32 may also affect the primary capacitive sensor(s) 26, 28 output signals.

In order to counter the unintended effects discussed above, the present system uses at least one secondary capacitive sensor 40 to detect the unintended capacitive signals. Multiple secondary capacitive sensors 40A-40G are illustrated in FIG. 2. Sensors 40A-40G are used to reduce different capacitive effects in a faucet 10. For instance, secondary capacitive sensor 40A is illustratively a metal plate or electrode located near or coupled to the metal sink basin 30 to reduce the effect of touching the metal sink basin 30. Such touching of the basin 30 may be confused by the controller 24 as a hands-free or proximity activation of the primary sensor(s) 26, 28.

Secondary capacitive sensor 40B is wrapped around or otherwise coupled to a sense wire 42 from primary capacitive sensor(s) 26, 28 to reduce the likelihood of activating the faucet 10 when the below deck sense wire 42 is moved or touched. A secondary capacitive sensor 40 may also be used as an antenna to reduce electromagnetic interference (EMI) or electrostatic discharge (ESD) false activations.

In an illustrated embodiment, a secondary sensor 40C is used to sense water going down the drain 34. Sensor 40C is useful to detect capacitive changes when water flows from sink basin 30 through drain 34. A secondary capacitive 40 may also be used on other drains under the sink, such as dishwasher drains or the like. Secondary capacitive sensors 40 are useful on any water-carrying equipment located below the deck 32 or under the sink basin 30, and any metal equipment or other equipment connected to water or located under the sink deck 32.

FIG. 2 also illustrates a secondary capacitive sensor 40D coupled to the garbage disposal 36. In addition, sensors 40E, 40F and 40G are shown coupled to fluid supply lines 23, 17 and 19, respectively, to sense capacitive changes when water flows therethrough.

Figure 3:
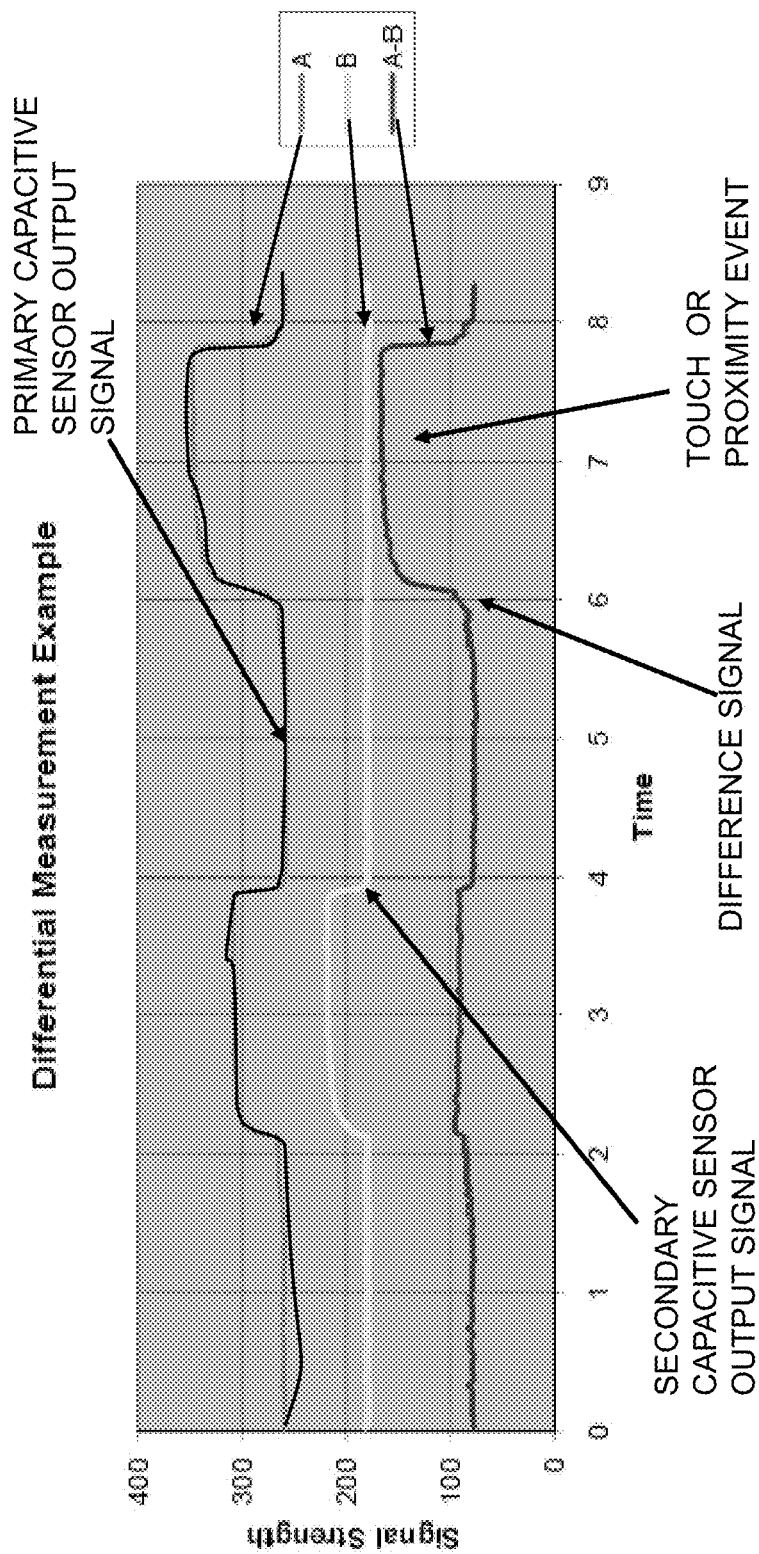
FIG. 3 illustrates exemplary output signals from a primary capacitive sensor and a secondary capacitive sensor, and a difference signal between the primary and secondary capacitive sensor output signals.

As shown in FIG. 3, an output signal from the at least one secondary capacitive sensor 40 is subtracted from the primary capacitive sensor(s) 26, 28 output signal so that the controller 24 more accurately measures the touch or proximity readings from the primary capacitive sensor(s) 26, 28. As shown in FIG. 3, signal A is the output signal from a primary capacitive sensor 26, 28 and signal B is the output signal from a secondary capacitive sensor 40. When B is subtracted from A, the touch or proximity event from the primary sensor(s) 26, 28 is easier to detect in the difference signal (A-B). The controller 24 processes the difference signal to more accurately measure the touch or proximity events detected by the primary capacitive sensor(s) 26, 28. In other words, the controller 24 accounts for input from the secondary capacitive sensor 40 when deciding whether to take action (e.g., control actuator driven valve 22).

FIG. 2 also illustrates an electronic soap dispenser 50 located adjacent the electronic faucet 10. Electronic soap dispenser 50 includes a dispensing head 51 having a soap outlet located above the deck 32. A liquid soap storage reservoir 53 is illustratively located below deck 32. A pump 55 is operably coupled to the reservoir 53. The pump 55 is also located below the deck 32. Pump 55 pumps liquid soap from the reservoir 53 to the outlet of the dispensing head 51 in response to a signal from controller 24.

Electronic soap dispenser 50 includes a capacitive sensor 52 coupled the dispensing head 51 or other suitable location. Capacitive sensor 52 provides an output signal which is electrically coupled to controller 24. Capacitive sensor 52 illustratively provides both a touch sensor and a hands-free proximity sensor. In the hands-free mode of operation, the capacitive sensor 52 and controller 24 detect a user's hands or other object within a detection zone located near dispensing head 51. Details of an exemplary electronic soap dispenser are disclosed in U.S. Application Ser. No. 61/765,501, filed on Feb. 15, 2013, the disclosure of which is expressly incorporated by reference herein.

The controller 24 may also distinguish between a touch input and a grasp input detected by capacitive sensor 52. Illustratively, a proximity input is distinguished from a contact (touch or grasp) input based upon an amplitude or intensity of the output signal from the capacitive sensor 52. A contact input is distinguished between a touch and a grasp based upon the duration of the contact output signal received from the capacitive sensor 52. A "grasp" is of longer duration than a "touch".

Illustratively, upon detecting a proximity output signal from the capacitive sensor 52, controller 24 causes pump 55 of the electronic soap dispenser 50 to dispense soap from reservoir 53 in a predetermined quantity. Upon detecting a touch output signal from the capacitive sensor 52, the controller 24 causes the pump 55 to dispense soap continuously. Illustratively, a timer within the controller 24 may limit the time for dispensing soap, for example, should a sensor malfunction or misuse occur. Upon detecting a grasp by the user, the controller 24 illustratively causes the pump to remain inactive, such that no soap is dispensed. As such, a user may grasp and rotate a spout of the electronic soap dispenser 50 without dispensing soap.

Capacitive sensors 26 and 28 on the spout 12 and handle 14, respectively, may cause inaccuracies to occur in the output signal from capacitive sensor 52 of electronic soap dispenser 50 due to cross-talk from capacitive sensors 26 and 28. Specifically, changes in capacitance of one of the capacitive sensors 26 or 28 may cause a change in capacitance detected by capacitive sensor 52. Such cross-talk is increased when sensors 26, 28 and 54 share a common controller 24. For example, controller 24 may interpret such changes in capacitance of capacitive sensor 52 caused by capacitive sensors 26, 28 as a proximity detection or a touch detection even though the user's hands are not in the detection zone or touching the electronic soap dispenser 50. Such cross-talk between capacitive sensors 26, 28 and 52 therefore may cause errors in controller 24 reading the signal from capacitive sensor 52 of electronic soap dispenser 50.

To reduce the effects of such cross-talk, capacitive sensor 52 includes a sensing electrode 54 coupled to controller 24 by a first sense wire 56. A second sense wire 58 having substantially the same length as first sense wire 56 is located within capacitive sensor 52 adjacent, but not contacting, the sensing electrode 54. Cross-talk from capacitive sensors 26 and 28, or other interference as discussed above, is sensed by both the first and second sense wires 56 and 58. Controller 24 performs a differential measurement between the capacitance detected on first sense line 56 and the capacitance detected on second sense line 58 to determine an actual capacitance detected by the electrode 54 of capacitive sensor 52 due to a user's hands being located in the detection zone or touching the capacitance sensor 52. This improves the accuracy of proximity and touch detection using the capacitive sensor 52 without the use of complicated software algorithms to reduce the effects of cross-talk.

Figure 4:
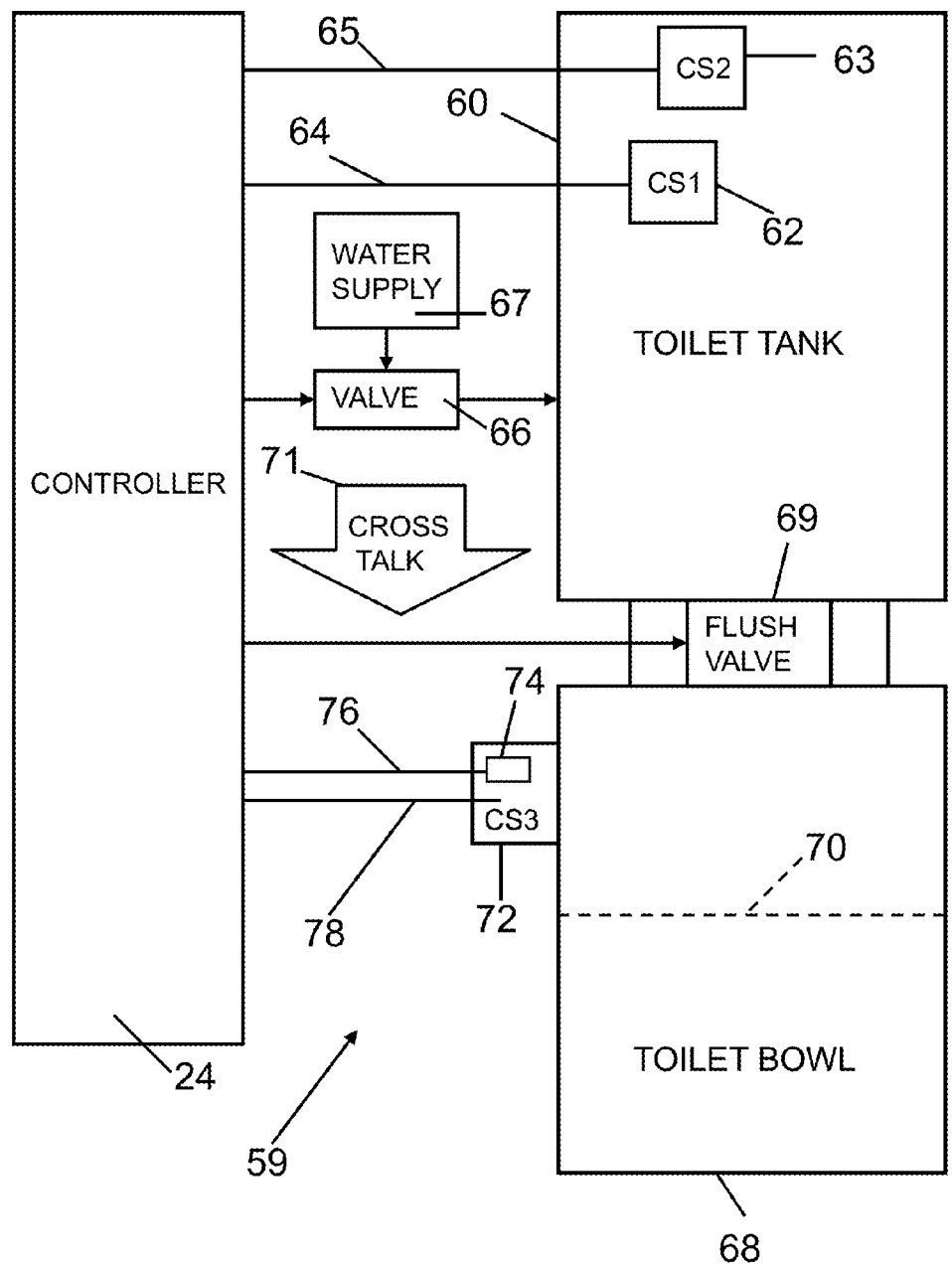
FIG. 4 is a block diagram illustrating details of capacitive sensors of an electronic toilet in another illustrated embodiment of the present disclosure.

Another embodiment of the present disclosure is illustrated in FIG. 4. In the FIG. 4 embodiment, an electronic toilet 59 includes a toilet tank 60 having first and second capacitive sensors 62 and 63. Capacitive sensors 62 and 63 are coupled to controller 24 by sense wires 64 and 65, respectively. Capacitive sensor 62 is illustratively a tank fill sensor located inside the tank 60. Controller 24 is coupled to a valve assembly 66 which controls flow of water from a water supply 67 to the tank 60. As water fills the toilet tank 60, water from water supply 67 changes the capacitance sensed by capacitive fill sensor 62. Tank fill sensor 62 detects that the tank 60 has been fully refilled when a water level in tank 60 rises to a level of the tank fill sensor 62. Controller 24 controls fill valve 66 in response to an output signal from capacitive sensor 62 detecting the water level within the toilet tank 60. As such, tank fill sensor 62, controller 24, and fill valve 66 operate together to fill tank 60 to a predetermined level.

Capacitive sensor 63 is illustratively a flush activation sensor coupled to the tank 60. Controller 24 is coupled to a flush valve 69 which controls flushing of the toilet in response to an output signal from the capacitive sensor 63 indicating activation of the sensor 63 by a user as discussed below.

A toilet bowl 68 is coupled to the toilet tank 60 in a conventional manner. Toilet bowl 68 has a normal fill level of water as illustrated by dotted line 70. A third capacitive sensor 72 is coupled to the toilet bowl at a location above the normal fill line 70. Capacitive sensor 72 measures capacitance as water fills the toilet bowl 60 to detect an overflow condition of toilet bowl 68 when water rises above the normal fill level 70. Details of an exemplary electronic toilet having a capacitive tank fill sensor 62, a capacitive flush sensor 63 and a capacitive bowl overflow sensor 72 are disclosed in U.S. Application Ser. No. 61/610,205, filed on Mar. 13, 2012, and U.S. Application Ser. No. 61/722,074, filed on Nov. 2, 2012, the disclosures of which are expressly incorporated by reference herein.

In use, the electronic toilet 59 is operated by initiating a flush cycle. When a user desires to flush the toilet, the user activates flush sensor 63. For example, a user's hand may be placed in proximity to (e.g., placed in front of) an indicator on the tank 60 located near capacitive flush sensor 63 in order to trigger the flush cycle. Flush sensor 63 receives the user input and sends an output signal to controller 24, which initiates operation of flush valve 69 and fill valve 66 to flush and refill the bowl. Before initiating the flush cycle, controller 24 receives an output signal from capacitive bowl overflow sensor 72 to determine if the water level in bowl 68 is below the predetermined normal fill level 70. If the water level in bowl 68 is at or below the level 70, then controller 24 initiates the flush cycle. Conversely, if bowl overflow capacitive sensor 72 signals to controller 24 that the water level in bowl 68 is above level 70, controller 24 will not initiate a flush cycle.

The capacitive sensors 62 and 63 located inside toilet tank 60 generally have negligible effects from cross-talk. However, overflow capacitive sensor 72 on toilet bowl 68 is more susceptible to cross-talk from the first and second capacitive sensors 62 and 63 as shown diagrammatically by arrow 71 in FIG. 4. For example, when water in the tank 60 contacts the capacitive tank fill sensor 62, a large capacitance increase occurs at the capacitive tank fill sensor 62. This may cause a smaller but detectable increase in capacitance of the bowl overflow capacitive sensor 72. Therefore, without compensation for cross-talk from the capacitive tank fill sensor 62, the cross-talk capacitance increase may cause the bowl overflow capacitive sensor 72 to falsely detect an overflow condition event.

To compensate for the potential cross-talk 71, capacitive sensor 72 includes an internal sensing electrode 74 coupled to controller by a first sense wire 76. A second sense wire 78 having substantially the same length as first sense wire 76 is located within capacitive sensor 72 but is not coupled to the sensing electrode 74. As discussed above, cross-talk from large capacitance changes of capacitive sensors 62 and 63, or other sources, causes the capacitance of first sense wire 76 to change by the same amount as the capacitance of second sense wire 78. Controller 24 measures actual capacitance changes of capacitive sensor 72 caused by water level changes within the toilet bowl 68 by taking a difference signal between the output signal from electrode 74 on first sense wire 76 and the output signal from second sense wire 78. Therefore, the controller 24 negates the effects of cross-talk from other capacitive sensors 62 and 63, or other interference sources, by taking the difference between the capacitance sensed on sense wires 76 and 78 before processing the difference signal from capacitive sensor 72. It is understood that tank fill capacitive sensor 62 and flush activation capacitive sensor 63 may also have the differential capacitance configuration of bowl overflow capacitive sensor 72, if necessary, due to cross-talk or other interference.

In illustrated embodiments of the present disclosure, a battery is used to power the components described herein. However, features of the system and method described herein are not limited to battery powered systems.

While this disclosure has been described as having exemplary designs and embodiments, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains. Therefore, although the invention has been described in detail with reference to certain illustrated embodiments, variations and modifications exist within the spirit and scope of the invention as described and defined in the following claims.

The invention claimed is:

1. An electronic toilet comprising:
   a toilet tank configured to receive and hold water from a water supply therein;
   at least one capacitive sensor located within the toilet tank;
   a toilet bowl in fluid communication with the toilet tank;
   a bowl overflow capacitive sensor coupled to the toilet bowl a location above a normal water fill level of the toilet bowl, the bowl overflow capacitive sensor including a sensing electrode, a first sense wire coupled to the electrode, and a second sense wire spaced apart from the electrode; and
   a controller coupled to the at least one capacitive sensor in the toilet tank and to the first and second sense wires of the bowl overflow capacitive sensor, the controller being programmed to determine a difference signal between output signals received from the first and second sense wires of the bowl overflow capacitive sensor to reduce the effect of cross-talk from the at least one capacitive sensor in the toilet tank on the bowl overflow capacitive sensor, and the controller also being programmed to analyze the difference signal to determine when a water level in the toilet bowl is above the normal water fill level of the toilet bowl.

2. The toilet of claim 1, wherein the controller is programmed to shut off the water supply to the toilet tank when the bowl overflow capacitive sensor detects a water level within the toilet bowl above the normal water fill level.

3. The toilet of claim 1, wherein the electrode coupled to the first sense wire of the bowl overflow capacitive sensor and an end of the second sensor wire are located within a housing, the housing being coupled to the toilet bowl above the normal fill level.

4. The toilet of claim 1, wherein the at least one capacitive sensor located within the toilet tank is a tank fill capacitive sensor.

5. The toilet of claim 1, wherein the at least one capacitive sensor located within the toilet tank is a flush activation capacitive sensor, the controller being programmed to open a flush valve to flush the toilet in response to a user activating the flush activation capacitive sensor.

6. The toilet of claim 5, wherein the controller is programmed to keep the flush valve closed without flushing the toilet in response to a user activating the flush activation capacitive sensor if the difference signal from the bowl overflow capacitive sensor indicates that the water level in the toilet bowl is above the normal water fill level.

7. The toilet of claim 1, wherein both a tank fill capacitive sensor and a flush activation capacitive sensor are located in the toilet tank and coupled to the controller.

8. A sensing apparatus comprising:
a first capacitive sensor coupled to a first component;
a second capacitive sensor coupled to a second component, the second capacitive sensor including a sensing electrode, a first sense wire coupled to the electrode, and a second sense wire spaced apart from the electrode; and
a controller coupled to the first capacitive sensor and to the first and second sense wires of the second capacitive sensor, the controller being programmed to determine a difference signal between first and second output signals received from the first and second sense wires of the second capacitive sensor, respectively, to reduce an effect of cross-talk from the first capacitive sensor on the second capacitive sensor, the controller also being programmed to analyze the difference signal to detect a change in capacitance of the second capacitive sensor caused by an event.

9. The apparatus of claim 8, wherein the first capacitive sensor is located within a toilet tank, the second capacitive sensor is coupled to a toilet bowl at a location above a normal water fill level of the toilet bowl, and the controller is programmed to analyze the difference signal to determine when a water level in the toilet bowl is above the normal water fill level of the toilet bowl.

10. The apparatus of claim 8, wherein the first capacitive sensor is coupled to an electronic faucet, the second capacitive sensor is operably coupled to a dispensing head of an electronic soap dispenser, and the controller is programmed to analyze the difference signal to detect actuation of the second capacitive sensor by a user.

* * * * *